(12) United States Patent
Zhao et al.

(10) Patent No.: US 10,882,967 B2
(45) Date of Patent: Jan. 5, 2021

(54) METHOD FOR PREPARING POLYIMIDE FILM HAVING LOW DIELECTRIC CONSTANT AND HIGH FRACTURE TOUGHNESS

(71) Applicant: SOUTH CHINA UNIVERSITY OF TECHNOLOGY, Guangzhou (CN)

(72) Inventors: Jianqing Zhao, Guangzhou (CN); Zhigeng Chen, Guangzhou (CN); Shumei Liu, Guangzhou (CN); Sen Zhang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 130 days.

(21) Appl. No.: 16/316,449

(22) PCT Filed: Nov. 30, 2017

(86) PCT No.: PCT/CN2017/113882
§ 371 (c)(1),
(2) Date: Jan. 9, 2019

(87) PCT Pub. No.: WO2018/166242
PCT Pub. Date: Sep. 20, 2018

(65) Prior Publication Data
US 2019/0292338 A1  Sep. 26, 2019

(30) Foreign Application Priority Data
Mar. 14, 2017  (CN) .......................... 2017 1 0149668

(51) Int. Cl.
*C08L 79/08* (2006.01)
*C08J 5/18* (2006.01)
(Continued)

(52) U.S. Cl.
CPC ............. *C08J 5/18* (2013.01); *C08F 283/124* (2013.01); *C08G 73/1039* (2013.01);
(Continued)

(58) Field of Classification Search
CPC ...... C08F 8/32; C08F 222/04; C08F 222/408; C08F 267/04; C08F 267/10;
(Continued)

(56) References Cited

U.S. PATENT DOCUMENTS

2009/0240019 A1* 9/2009 Inoue ..................... C08G 18/10
528/59
2010/0317774 A1* 12/2010 Sugioka ................. C08G 77/26
524/89

FOREIGN PATENT DOCUMENTS

CN  104356413  2/2015
CN  105400196  3/2016
(Continued)

OTHER PUBLICATIONS

Translation of CN 104356413 (2015) (Year: 2015).*

*Primary Examiner* — Robert C Boyle
(74) *Attorney, Agent, or Firm* — JMB Davis Ben-David

(57) ABSTRACT

The invention discloses a preparation method of a polyimide film having a low dielectric constant and high fracture toughness; in the method an aromatic diamine solution is firstly prepared, and then a poly(5-norbornene-2,3-dicarboxylic anhydride-alt-maleimide isobutyl polyhedral oligomeric silsesquioxane) and aromatic dianhydride are ground, uniformly mixed, added to the aromatic diamine solution, and stirred to obtain a poly(5-norbornene-2,3-dicarboxylic anhydride-alt-maleimide isobutyl polyhedral oligomeric silsesquioxane)/polyamic acid solution; the solution is uniformly applied on a clean glass sheet, then placed in a vacuum drying oven, cooled to room temperature, and then a film is peeled off in water by ultrasonic and dried under (Continued)

vacuum to obtain the desired product. The dielectric constant of the film obtained by the invention is reduced to 2.2, and the elongation at break is increased by 272%, the tensile breaking energy is increased by 285%, showing greatly improved elongation at break and fracture energy, and good fracture toughness.

10 Claims, 3 Drawing Sheets

(51) Int. Cl.
    *C08G 73/10* (2006.01)
    *C08G 77/388* (2006.01)
    *C09D 5/20* (2006.01)
    *C08F 283/12* (2006.01)

(52) U.S. Cl.
    CPC ....... *C08G 73/1071* (2013.01); *C08G 77/388* (2013.01); *C08L 79/08* (2013.01); *C09D 5/20* (2013.01); *C08J 2379/08* (2013.01); *C08L 2203/16* (2013.01)

(58) Field of Classification Search
CPC .. C08F 283/124; C08F 220/70; C08F 220/52; C08F 230/08; C08G 73/1028; C08G 73/105; C08G 73/1071; C08G 83/001; C08G 73/1039; C08G 77/388; C08G 77/26; C08G 73/1042; C08G 73/1078; C09D 5/20; C09D 183/08; C08J 5/18; C08J 2379/08; C08J 2383/10; C08L 79/08; C08L 2203/16
See application file for complete search history.

(56) References Cited

FOREIGN PATENT DOCUMENTS

| | | |
|---|---|---|
| CN | 106916324 | 7/2017 |
| JP | 2016124157 | 7/2016 |

\* cited by examiner

METHOD FOR PREPARING POLYIMIDE FILM HAVING LOW DIELECTRIC CONSTANT AND HIGH FRACTURE TOUGHNESS

CROSS-REFERENCE TO RELATED APPLICATIONS

This is the U.S. National Stage of International Application No. PCT/CN2017/113882 filed Nov. 30, 2017, which was published in Chinese under PCT Article 21(2), and which in turn claims the benefit of China Patent Application No. 201710149668.6, filed Mar. 14, 2017.

TECHNICAL FIELD

The invention relates to a preparation method of a high performance polyimide (PI) film, in particular to a preparation method of a polyimide film with a low dielectric constant and high fracture toughness, and belongs to the technical field of organic polymer material modification.

BACKGROUND

As a dielectric material, polyimide has excellent high and low temperature resistance, mechanical properties, electrical properties, dimensional stability, chemical solvent resistance, etc., but its dielectric constant is about 3.5, which is difficult to meet the need for dielectric applications in large-scale integrated circuit manufacturing industry. Polyhedral oligomeric silsesquioxane (POSS) is a kind of organic-inorganic hybrid molecule with nanometer scale with good structure symmetry and low molecular polarizability, which has been widely used in modifications of polyimide film for lowering dielectric constant, improving strength, etc.

Leu et al. (Macromolecules, 2003, 36, 9122-9127) prepared a PI with POSS in the main chain by copolymerization of POSS with two amino groups, 4,4-diaminodiphenyl ether and pyromellitic dianhydride. When the amount of the POSS is 5 mol %, the dielectric constant of the PI film is lowered from 3.26 to 2.86, which shows a good effect of lowering the dielectric constant of PI, but the elongation at break of the PI film is reduced from 6% to 5%.

Wang et al. (Chinese J Polym Sci, 2016, 34(11), 1363-1372) employed the reactivity of amino group on aminopropyl heptaisobutyl POSS to suspend the POSS segments on fluorinated PI chain. When the amount of aminopropyl heptaisobutyl POSS is 5.8 wt %, the dielectric constant of the PI film decreases from 3.21 of pure PI film to 3.01, but the elongation at break decreases from 9.7% to 8.0%; and with the amount of aminopropyl heptaisobutyl POSS increases, the elongation at break of the PI film gradually decreases.

Zhang et al. (Compos Part B, 2014, 56, 808-814) discussed the relationship between POSS content and elongation at break of POSS/PI film, which concluded that poor compatibility between POSS and PI matrix resulted in agglomeration of POSS and phase separation, thereby reducing the elongation at break of the PI film, i.e., reducing the fracture toughness.

In summary, the prior art introduces POSS molecules into PI molecular chains through the reaction of amino group, but when the amount of POSS is high, agglomeration or phase separation occurs, which results in poor fracture toughness of PI while lowering the dielectric constant. Therefore, the PI film modified by POSS has a problem that the low dielectric constant and fracture toughness is hard to be achieved at the same time.

SUMMARY OF THE INVENTION

In view of the deficiencies of the prior art, the present invention provides a method for preparing a polyimide film with a low dielectric constant and high fracture toughness.

The present invention prepares an alternating copolymer (P(NA-alt-MIPOSS)) by free-radical copolymerization of 5-norbornene-2,3-dicarboxylic anhydride and maleimide isobutyl polyhedral oligomeric silsesquioxane. In the poly (5-norbornene-2,3-dicarboxylic anhydride-alt-maleimide isobutyl polyhedral oligomeric silsesquioxane), the 5-norbornene-2,3-dicarboxylic anhydride segment separates the maleimide isobutyl polyhedral oligomeric silsesquioxane segment one by one to uniformly "align" them on the copolymer chain; the alternating copolymer is used as a co-monomer of aromatic dianhydride, and the anhydride groups react with the aromatic diamine, which is thus incorporated into the PI chain. The PI molecular chains are then slightly cross-linked, and the POSS molecule is suspended on the PI chain, meanwhile the norbornene avoids the agglomeration between the POSS molecules so that the POSS molecules are well dispersed in the PI matrix even at high loading. When experiencing tensile stress, the stress is concentrated around the well dispersed POSS molecules in PI matrix, which produces a large amount of crazes and holes that absorb energy, thereby improving the fracture toughness of the PI film.

The invention separates the nano-scale maleimide isobutyl polyhedral oligomeric silsesquioxane molecules one by one by free-radical copolymerization. Through the reaction between alternating copolymer and aromatic diamine, the POSS molecules are well dispersed in the PI matrix even at high loading, giving the polyimide a low dielectric constant and high fracture toughness. The present invention well solves the problem of dispersion of POSS introduced into polyimide, and obtains a high performance PI film.

The objects of the invention are achieved by the following technical solutions: A method for preparing a polyimide film having a low dielectric constant and high fracture toughness, comprising the steps of:

(1) Dissolving aromatic diamine in a polar organic solvent at an ambient humidity of lower than 50% under ice bath and nitrogen atmosphere, maintaining the mass concentration thereof at 6% to 10%; after the aromatic diamine is completely dissolved, further stirring for 25 to 35 minutes to obtain an aromatic diamine solution; wherein the aromatic diamine is 4,4'-diaminodiphenyl ether, p-phenylenediamine or 4,4'-diamino-2,2'-bistrifluoromethylbiphenyl;

(2) grinding and mixing poly(5-norbornene-2,3-dicarboxylic anhydride-alt-maleimide isobutyl polyhedral oligomeric silsesquioxane) and aromatic dianhydride, adding to the aromatic diamine solution prepared in step (1) and stirring for 12 to 24 h to obtain a poly(5-norbornene-2,3-dicarboxylic anhydride-alt-maleimide isobutyl polyhedral oligomeric silsesquioxane)/polyamic acid solution; wherein the molar ratio of the aromatic dianhydride and the aromatic diamine is 1:1, and the mass of the poly(5-norbornene-2,3-dicarboxylic anhydride-alt-maleimide isobutyl polyhedral oligomeric silsesquioxane) is 1% to 6% of the total mass of the aromatic dianhydride and the aromatic diamine;

(3) uniformly applying the poly(5-norbornene-2,3-dicarboxylic anhydride-alt-maleimide isobutyl polyhedral oligomeric silsesquioxane)/polyamic acid solution prepared in step (2) on a clean glass sheet, then placing it in a vacuum drying oven to remove the bubbles under vacuum for 4-6 h; heating and maintaining the temperature according to the preset program, which comprises maintaining at 70±2° C. for 1.8-2.2 h, maintaining at 120±2° C. for 1-1.2 h, maintaining at 150±2° C. for 1.8-2.2 h, maintaining at 200±2° C. for 1-1.2 h and maintaining at 300±2° C. for 1-1.2 h; after that cooling to room temperature, peeling off a film by ultrasonic in water, then drying the film under vacuum to obtain the polyimide film having a low dielectric constant and high fracture toughness.

Preferably, the polar organic solvent in step (1) is one or more selected from the group consisting of N-methylpyrrolidone, N, N-dimethylformamide and tetrahydrofuran.

Preferably, the poly(5-norbornene-2,3-dicarboxylic anhydride-alt-maleimide isobutyl polyhedral oligomeric silsesquioxane) in step (2) is prepared by: dissolving 5-norbornene-2,3-dicarboxylic anhydride and maleimide isobutyl polyhedral oligomeric silsesquioxane with a molar ratio of 2:1-4:1 in an inert solvent, keeping the total mass concentration of the 5-norbornene-2,3-dicarboxylic anhydride and the maleimide isobutyl polyhedral oligomeric silsesquioxane between 15% and 20%, and adding azobisisobutyronitrile initiator; then vacuumizing, refilling with nitrogen, and repeatedly conducting vacuumizing and refilling with nitrogen; after that heating to 65-75° C. for free radical copolymerization, finishing the reaction after stirring for 12-24 h; pouring the obtained solution in methanol for precipitation of pale yellow precipitate; then conducting filtration, washing the residue with methanol repeatedly, and drying under vacuum to obtain a powdery poly(5-norbornene-2,3-dicarboxylic anhydride-alt-maleimide isobutyl polyhedral oligomeric silsesquioxane).

Preferably, the inert solvent is 1,4-dioxane, chlorobenzene, toluene or nitrobenzene.

Preferably, the amount of the azobisisobutyronitrile initiator is 0.1% to 1% of the total mass of the 5-norbornene-2,3-dicarboxylic anhydride and the maleimide isobutyl polyhedral oligomeric silsesquioxane.

Preferably, said repeatedly conducting vacuumizing and refilling with nitrogen refers to conducting for three or more times.

Preferably, the aromatic dianhydride in step (2) is 1, 2, 4, 5-pyromellitic dianhydride, 3,3',4,4'-biphenyltetracarboxylic dianhydride or 4,4'-(hexafluoroisopropene) dinonanhydride.

Preferably, when mixing the poly(5-norbornene-2,3-dicarboxylic anhydride-alt-maleimide isobutyl polyhedral oligomeric silsesquioxane) and the aromatic dianhydride followed by adding to the aromatic diamine solution, they are firstly divided into four equal portions, and each portion is added at an interval of 25-35 min.

Preferably, the time for peeling off the polyimide film in water by ultrasonic in step (3) is 5-10 min.

Preferably, said drying the film under vacuum is conducted in an oven at 60-80° C. for more than 12 h.

Compared with the prior art, the invention has the following effects:

In the present invention, by using poly(5-norbornene-2, 3-dicarboxylic anhydride-alt-maleimide isobutyl polyhedral oligomeric silsesquioxane) as a comonomer of aromatic dianhydride into a PI, the dielectric constant thereof is reduced to 2.2, and the elongation at break is increased by 272%, the tensile fracture energy is increased by 285%. The elongation at break and the tensile fracture energy are greatly improved to achieve good fracture toughness.

DETAILED DESCRIPTION WITH EMBODIMENTS

The present invention will be further described with reference to the accompanying drawings and embodiments, but the embodiments are not intended to limit the scope of the invention.

Figure 1A:
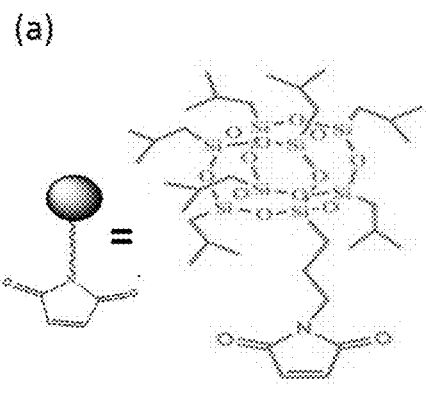
FIG. 1 (a) is a structural formula of the maleimide isobutyl polyhedral oligomeric silsesquioxane monomer used in example 1.
FIG. 1(b) is a structural formula of the poly(5-norbornene-2,3-dicarboxylic anhydride-alt-maleimide isobutyl polyhedral oligomeric silsesquioxane) prepared in example 1.
Figure 1B:
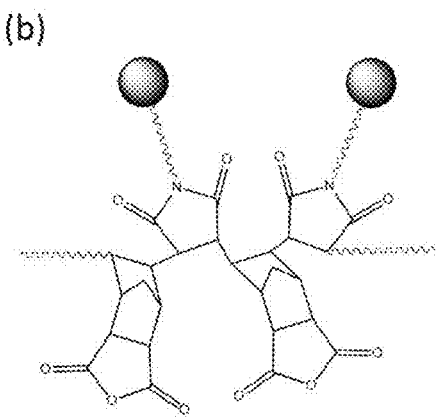

In the following examples, the 5-norbornene-2,3-dicarboxylic anhydride (NA), 4,4'-diaminodiphenyl ether (ODA), p-phenylenediamine (PDA), 4,4'-diamino-2,2'-bistrifluoromethylbiphenyl (TFMB), 1,2,4,5-pyromellitic dianhydride (PMDA), 3,3',4,4'-biphenyltetracarboxylic dianhydride (BPDA) and 4 4'-(hexafluoroisopropene) diphthalic anhydride (6FDA) are products of Shanghai Adamas Reagent Co., Ltd. (Adamas); the maleimide isobutyl polyhedral oligomeric silsesquioxane (MIPOSS) is product of American Hybrid Plastics, whose structural formula is shown in FIG. 1 (a), and the monomer thereof is a monofunctional POSS, that is, it only contains one maleimide group that can participate in the reaction; the recrystallized azobisisobutyronitrile (AIBN) is product of Aladdin Chemicals; the 1,4-dioxane, chlorobenzene, toluene, nitrobenzene, methanol, tetrahydrofuran (THF), N-methylpyrrolidone (NMP) and N,N-dimethylformamide (DMF) are products of Jiangsu Qiangsheng Functional Chemical Co., Ltd. (Enox); the calcium hydride (CaH) and phosphorus pentoxide ($P_2O_5$) are products of Guangzhou Chemical Reagent.

NMP is dehydrated before use. The specific method is as follows: adding appropriate amount of $P_2O_5$, sealing, leaving at room temperature for 12 hours, and then distilling under reduced pressure to obtain anhydrous NMP. Before the use of DMF or THF, appropriate amount of CaH was added and the mixture was stirred for 12 hours followed by decompressing distillation; ODA, PDA and TFMB were placed in a vacuum oven and dried under vacuum at 60° C. for 48 h; PMDA, BPDA and 6FDA were placed in a vacuum oven and dried under vacuum at 140° C. for 48 hours.

The glass piece (170 mm×150 mm×3 mm) was cleaned with deionized water and placed in an oven at 80° C. for 12 hours before use.

Example 1

Figure 2:
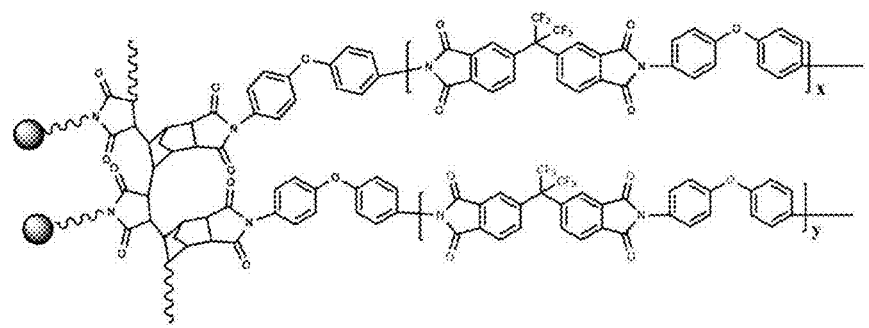
FIG. 2 is a structural formula of a 6FDA-ODA type PI film prepared in example 1.
Figure 3:
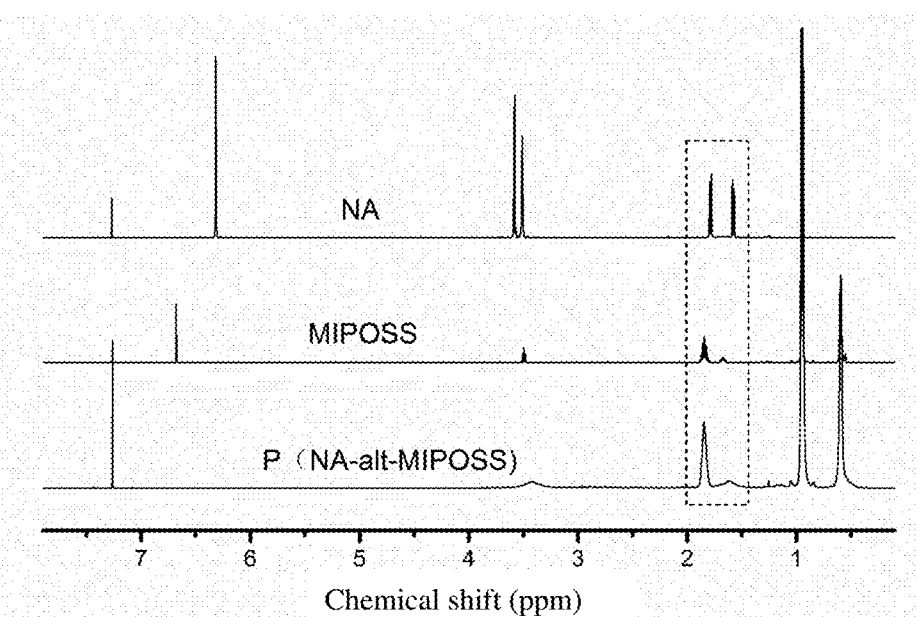
FIG. 3 is the $^1$H NMR spectrum of the 5-norbornene-2, 3-dicarboxylic anhydride (NA), the maleimide isobutyl polyhedral oligomeric silsesquioxane (MIPOSS) and the prepared poly(5-norbornene-2,3-dicarboxylic anhydride-alt-maleimide isobutyl polyhedral oligomeric silsesquioxane) (P(NA-alt-MIPOSS)) in example 1.
Figure 4:
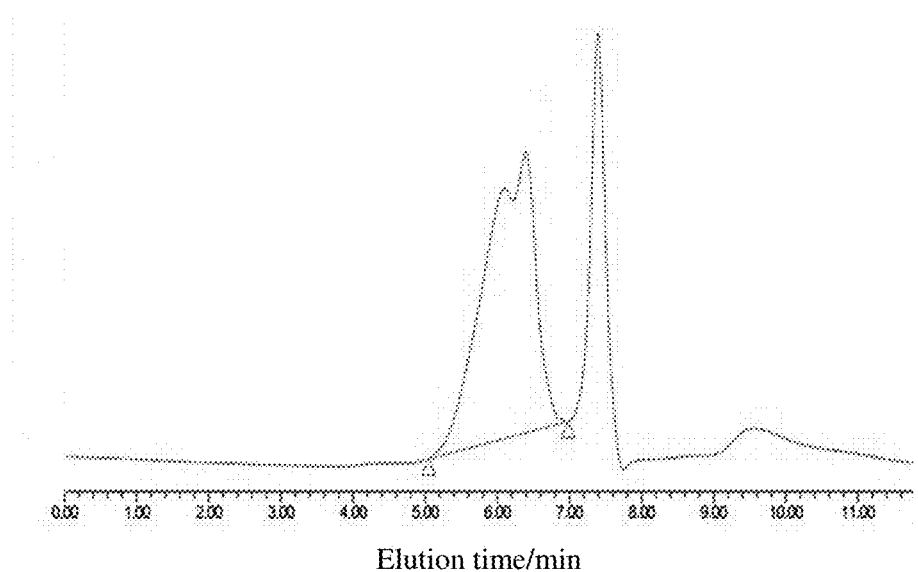
FIG. 4 shows the GPC result of the poly(5-norbornene-2,3-dicarboxylic anhydride-alt-maleimide isobutyl polyhedral oligomeric silsesquioxane) in example 1.
Figure 5:
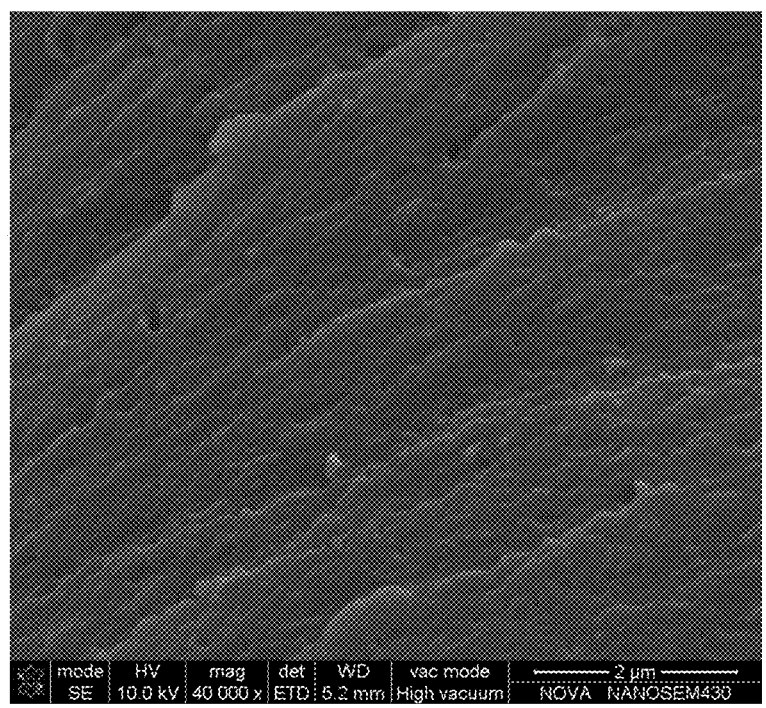
FIG. 5 is a SEM image showing a tensile section of a 6FDA-ODA type PI film prepared in example 1.

(1) 10 mmol of 5-norbornene-2,3-dicarboxylic anhydride, 5 mmol of maleimide isobutyl polyhedral oligomeric silsesquioxane, 6.5 mg of AIBN and 25.6 g of 1,4-dioxane were sequentially added to a 50 mL reaction flask and stirred for homogenization. Then the reaction flask was vacuumed, then filled with nitrogen. The vacuum and nitrogen filling steps were repeated for more than 3 times, then the reaction flask was placed in 75° C. constant temperature oil bath for 24 hours, after which the reaction was terminated; the solution was poured into about 300 mL of methanol for precipitation, then filtration was conducted to obtain a solid product, which was washed thoroughly with methanol, and then dried in an oven at 60° C. for 8 hours or more to obtain a powdery product, poly(5-norbornene-2,3-dicarboxylic anhydride-alt-maleimide isobutyl polyhedral oligomeric silsesquioxane), denoted as P(NA-alt-MIPOSS) with a structural formula shown in FIG. 1(b). The 5-norbornene-2,3-dicarboxylic anhydride separates MIPOSS one by one, thereby avoiding the agglomeration of POSS in the matrix during the preparation of polyimide; a small amount of the product P (NA-alt-MIPOSS) was dissolved in chloroform deuteration reagent for $^1$H NMR test, the results are shown in FIG. 3. From the figure, it can be seen that there is no absorption peak representing hydrogen connected to a double bond near the chemical shift of 6.5 ppm, indicating that the product contains no unreacted monomer. From the ratio of the integrated peak area at chemical shifts of 1.85 ppm and 1.63 ppm, the mole fraction of 5-norbornene-2,3-dicarboxylic anhydride in the product was calculated to be 52%, thereby confirming that the poly(5-norbornene-2,3-dicarboxylic anhydride-alt-maleimide isobutyl polyhedral oligomeric silsesquioxane)—was alternating copolymer; the product was dissolved in tetrahydrofuran for GPC test, and the result is shown in FIG. 4. From the figure it can be seen that the alternating copolymer's $M_w$=4087, PDI=1.39, and has about 3 repeating units;

(2) 0.1542 g of the P (NA-alt-MIPOSS) and 5 mmol of 6FDA were mixed and ground in a mortar to obtain a mixed acid anhydride;

(3) Under nitrogen atmosphere, at 40% humidity and 0° C., 5 mmol of ODA, 10 g of DMF and 6.7 g of THF were added to a 50 mL three-necked flask until the ODA was completely dissolved. Then under mechanical stirring, the mixed acid anhydride obtained in step (2) was divided into four equal portions, and each portion was added to the above three-necked flask at an interval of 30 minutes; after the mixed acid anhydride was all added, stirring was continued for 12 hours to obtain a P(NA-alt-MIPOSS)/6FDA-ODA type polyamic acid solution;

(4) The prepared P(NA-alt-MIPOSS)/6FDA-ODA type polyamic acid solution was poured onto a clean glass plate, coated homogeneously by an automatic coating machine, and placed in a vacuum drying oven to remove air bubbles under vacuum for 5 hours; according to the preset program, the temperature was raised to 70° C. for 2 hours, 120° C. for 1 hour, 150° C. for 2 hours, 200° C. for 1 hour, 300° C. for 1 hour for thermal imidization. After the treatment, the film was cooled to room temperature, peeled off in water for 5 minutes by ultrasonic, and was vacuum dried in an oven at 60° C. for 12 hours to obtain a 6FDA-ODA type PI film with a low dielectric constant and high fracture toughness. The thickness of the film is 68 μm, and the theoretical content of P(NA-alt-MIPOSS) is 6 wt %. The structural formula of the PI film is as shown in FIG. 2, and the anhydride groups in P(NA-alt-MIPOSS) can react with ODA, so as to achieve "suspension" of POSS molecules in the PI molecular chain, which increases the interaction between POSS and the PI molecular chain, which is beneficial to improve the mechanical properties of the film. After the tensile test, the SEM image of tensile fractured section of the film is shown in FIG. 5 (magnified 40,000 times), from the figure it can be seen that the cross section becomes rough and pores having a size of less than 1 μm are formed, which can absorb a large amount of energy during the tensile test of the sample, resulting in an increase in the fracture toughness of the film.

Example 2

(1) 10 mmol of 5-norbornene-2,3-dicarboxylic anhydride, 5 mmol of maleimide isobutyl polyhedral oligomeric silsesquioxane, 6.5 mg of AIBN and 25.6 g of 1,4-dioxane were sequentially added to a 50 mL reaction flask and stirred for homogenization. Then the reaction flask was vacuumed, then filled with nitrogen. The vacuum and nitrogen filling steps were repeated for more than 3 times, then the reaction flask was placed in 75° C. constant temperature oil bath for 24 hours, after which the reaction was terminated; the solution was poured into about 300 mL of methanol for precipitation, then filtration was conducted to obtain a solid product, which was washed thoroughly with methanol, and then dried in an oven at 60° C. for 8 hours or more to obtain a powdery product, poly(5-norbornene-2,3-dicarboxylic anhydride-alt-maleimide isobutyl polyhedral oligomeric silsesquioxane), denoted as P(NA-alt-MIPOSS);

(2) 0.1028 g of the P (NA-alt-MIPOSS) and 5 mmol of 6FDA were mixed and ground in a mortar to obtain a mixed acid anhydride;

(3) Under nitrogen atmosphere, at 40% humidity and 0° C., 5 mmol of ODA, 10 g of DMF and 6.7 g of THF were added to a 50 mL three-necked flask until the ODA was completely dissolved. Then under mechanical stirring, the mixed acid anhydride obtained in step (2) was divided into four equal portions, and each portion was added to the above three-necked flask at an interval of 30 minutes; after the mixed acid anhydride was all added, stirring was continued for 12 hours to obtain a P(NA-alt-MIPOSS)/6FDA-ODA type polyamic acid solution;

(4) The prepared P(NA-alt-MIPOSS)/6FDA-ODA type polyamic acid solution was poured onto a clean glass plate, coated homogeneously by an automatic coating machine, and placed in a vacuum drying oven to remove air bubbles under vacuum for 5 hours; according to the preset program, the temperature was raised to 70° C. for 2 hours, 120° C. for 1 hour, 150° C. for 2 hours, 200° C. for 1 hour, 300° C. for 1 hour for thermal imidization. After the treatment, the film was cooled to room temperature, peeled off in water for 5 minutes by ultrasonic, and was vacuum dried in an oven at 60° C. for 12 hours to obtain a 6FDA-ODA type PI film with a low dielectric constant and high fracture toughness. The thickness of the film is 63 μm, and the theoretical content of P(NA-alt-MIPOSS) is 4 wt %.

Example 3

(1) 10 mmol of 5-norbornene-2,3-dicarboxylic anhydride, 5 mmol of maleimide isobutyl polyhedral oligomeric silsesquioxane, 6.5 mg of AIBN and 25.6 g of nitrobenzene were sequentially added to a 50 mL reaction flask and stirred for homogenization. Then the reaction flask was vacuumed, then filled with nitrogen. The vacuum and nitrogen filling steps were repeated for more than 3 times, then the reaction flask was placed in 75° C. constant temperature oil bath for 24 hours, after which the reaction was terminated; the solution was poured into about 300 mL of methanol for precipitation, then filtration was conducted to obtain a solid product, which was washed thoroughly with methanol, and then dried in an oven at 60° C. for 8 hours or more to obtain a powdery product, poly(5-norbornene-2,3-dicarboxylic anhydride-alt-maleimide isobutyl polyhedral oligomeric silsesquioxane), denoted as P(NA-alt-MIPOSS);

(2) 0.0257 g of the P (NA-alt-MIPOSS) and 5 mmol of 6FDA were mixed and ground in a mortar to obtain a mixed acid anhydride;

(3) Under nitrogen atmosphere, at 40% humidity and 0° C., 5 mmol of ODA, 10 g of DMF and 6.7 g of THF were added to a 50 mL three-necked flask until the ODA was completely dissolved. Then under mechanical stirring, the mixed acid anhydride obtained in step (2) was divided into four equal portions, and each portion was added to the above three-necked flask at an interval of 30 minutes; after the mixed acid anhydride was all added, stirring was continued for 12 hours to obtain a P(NA-alt-MIPOSS)/6FDA-ODA type polyamic acid solution;

(4) The prepared P(NA-alt-MIPOSS)/6FDA-ODA type polyamic acid solution was poured onto a clean glass plate, coated homogeneously by an automatic coating machine, and placed in a vacuum drying oven to remove air bubbles under vacuum for 5 hours; according to the preset program, the temperature was raised to 70° C. for 2 hours, 120° C. for 1 hour, 150° C. for 2 hours, 200° C. for 1 hour, 300° C. for 1 hour for thermal imidization. After the treatment, the film was cooled to room temperature, peeled off in water for 5 minutes by ultrasonic, and was vacuum dried in an oven at 60° C. for 12 hours to obtain a 6FDA-ODA type PI film with a low dielectric constant and high fracture toughness. The thickness of the film is 66 μm, and the theoretical content of P(NA-alt-MIPOSS) is 1 wt %.

Example 4

(1) 20 mmol of 5-norbornene-2,3-dicarboxylic anhydride, 5 mmol of maleimide isobutyl polyhedral oligomeric silsesquioxane, 65 mg of AIBN and 45.6 g of chlorobenzene were sequentially added to a 50 mL reaction flask and stirred for homogenization. Then the reaction flask was vacuumed, then filled with nitrogen. The vacuum and nitrogen filling steps were repeated for more than 3 times, then the reaction flask was placed in 75° C. constant temperature oil bath for 24 hours, after which the reaction was terminated; the solution was poured into about 300 mL of methanol for precipitation, then filtration was conducted to obtain a solid product, which was washed thoroughly with methanol, and then dried in an oven at 60° C. for 8 hours or more to obtain a powdery product, poly(5-norbornene-2,3-dicarboxylic anhydride-alt-maleimide isobutyl polyhedral oligomeric silsesquioxane), denoted as P(NA-alt-MIPOSS);

(2) 0.1542 g of the P (NA-alt-MIPOSS) and 5 mmol of PMDA were mixed and ground in a mortar to obtain a mixed acid anhydride;

(3) Under nitrogen atmosphere, at 40% humidity and 0° C., 5 mmol of TFMB, 10 g of DMF and 6 g of THF were added to a 50 mL three-necked flask until the TFMB was completely dissolved. Then under mechanical stirring, the mixed acid anhydride obtained in step (2) was divided into four equal portions, and each portion was added to the above three-necked flask at an interval of 30 minutes; after the mixed acid anhydride was all added, stirring was continued for 12 hours to obtain a P(NA-alt-MIPOSS)/PMDA-TFMB type polyamic acid solution;

(4) The prepared P(NA-alt-MIPOSS)/PMDA-TFMB type polyamic acid solution was poured onto a clean glass plate, coated homogeneously by an automatic coating machine, and placed in a vacuum drying oven to remove air bubbles under vacuum for 5 hours; according to the preset program, the temperature was raised to 70° C. for 2 hours, 120° C. for 1 hour, 150° C. for 2 hours, 200° C. for 1 hour, 300° C. for 1 hour for thermal imidization. After the treatment, the film was cooled to room temperature, peeled off in water for 5 minutes by ultrasonic, and was vacuum dried in an oven at 60° C. for 12 hours to obtain a PMDA-TFMB type PI film with a low dielectric constant and high fracture toughness. The thickness of the film is 59 μm, and the theoretical content of P(NA-alt-MIPOSS) is 6 wt %.

Example 5

(1) 10 mmol of 5-norbornene-2,3-dicarboxylic anhydride, 5 mmol of maleimide isobutyl polyhedral oligomeric silsesquioxane, 0.08 g of AIBN and 25.6 g of toluene were sequentially added to a 50 mL reaction flask and stirred for homogenization. Then the reaction flask was vacuumed, then filled with nitrogen. The vacuum and nitrogen filling steps were repeated for more than 3 times, then the reaction flask was placed in 75° C. constant temperature oil bath for 24 hours, after which the reaction was terminated; the solution was poured into about 300 mL of methanol for precipitation, then filtration was conducted to obtain a solid product, which was washed thoroughly with methanol, and then dried in an oven at 60° C. for 8 hours or more to obtain a powdery product, poly(5-norbornene-2,3-dicarboxylic anhydride-alt-maleimide isobutyl polyhedral oligomeric silsesquioxane), denoted as P(NA-alt-MIPOSS);

(2) 0.1542 g of the P (NA-alt-MIPOSS) and 5 mmol of BPDA were mixed and ground in a mortar to obtain a mixed acid anhydride;

(3) Under nitrogen atmosphere, at 40% humidity and 0° C., 5 mmol of PDA, 6 g of NMP and 3 g of THF were added to a 50 mL three-necked flask until the PDA was completely dissolved. Then under mechanical stirring, the mixed acid anhydride obtained in step (2) was divided into four equal portions, and each portion was added to the above three-necked flask at an interval of 30 minutes; after the mixed acid anhydride was all added, stirring was continued for 12 hours to obtain a P(NA-alt-MIPOSS)/BPDA-PDA type polyamic acid solution;

(4) The prepared P(NA-alt-MIPOSS)/BPDA-PDA type polyamic acid solution was poured onto a clean glass plate, coated homogeneously by an automatic coating machine, and placed in a vacuum drying oven to remove air bubbles under vacuum for 5 hours; according to the preset program, the temperature was raised to 70° C. for 2 hours, 120° C. for 1 hour, 150° C. for 2 hours, 200° C. for 1 hour, 300° C. for 1 hour for thermal imidization. After the treatment, the film was cooled to room temperature, peeled off in water for 5 minutes by ultrasonic, and was vacuum dried in an oven at 60° C. for 12 hours to obtain a BPDA-PDA type PI film with a low dielectric constant and high fracture toughness. The thickness of the film is 63 μm, and the theoretical content of P(NA-alt-MIPOSS) is 6 wt %.

Comparative Example 1

(1) Under nitrogen atmosphere, at 40% humidity and 0° C., 5 mmol of ODA, 10 g of DMF and 6.7 g of THF were added to a 50 mL three-necked flask until the ODA was completely dissolved. Then under mechanical stirring, 5 mmol of 6FDA was divided into four equal portions, and each portion was added to the above three-necked flask at an interval of 30 minutes; after the mixed acid anhydride was all added, stirring was continued for 12 hours to obtain a P(NA-alt-MIPOSS)/6FDA-ODA type polyamic acid solution;

(2) A 6FDA-ODA type polyimide film was prepared by the same method as step (4) of example 1, and the thickness of the prepared film is 61 µm.

Comparative Example 2

(1) 0.1542 g of MIPOSS and 5 mmol of 6FDA were mixed and ground in a mortar to obtain a mixed acid anhydride;

(2) Under nitrogen atmosphere, at 40% humidity and 0° C., 5 mmol of ODA, 10 g of DMF and 6.7 g of THF were added to a 50 mL three-necked flask until the ODA was completely dissolved. Then under mechanical stirring, the mixed acid anhydride obtained in step (1) was divided into four equal portions, and each portion was added to the above three-necked flask at an interval of 30 minutes; after the mixed acid anhydride was all added, stirring was continued for 12 hours to obtain a P(NA-alt-MIPOSS)/6FDA-ODA type polyamic acid solution;

(2) A 6FDA-ODA type polyimide film was prepared by the same method as step (4) of example 1, and the theoretical content of P(NA-alt-MIPOSS) is 6 wt %, and the thickness of the prepared film is 63 µm.

Measure tensile modulus according to GB/T 1040.3-2006, measure tensile strength according to GB/T1040.3-2006, measure elongation at break according to GB/T1040.3-2006, measure fracture energy according to ASTM D882-12 and measure dielectric constant according to GB/T 1409-2006. Mechanical properties and dielectric constant of the polyimide films prepared in examples 1 to 5 and comparative Examples 1 and 2 are shown in Table 1.

As can be seen from the table, the present invention uses poly(5-norbornene-2,3-dicarboxylic anhydride-alt-maleimide isobutyl polyhedral oligomeric silsesquioxane) as a comonomer of an aromatic dianhydride to introduce into a polyimide. The prepared 6FDA-ODA type PI film has a dielectric constant low to 2.2, a tensile elongation at break of 30.9%, and tensile fracture energy of 26.2 MJ/m$^3$; compared with primitive 6FDA-ODA type PI film, the dielectric constant is decreased by 29%, the elongation at break is increased by 272%, the tensile fracture energy is increased by 285%. The 6FDA-ODA type PI film prepared with the same amount of MIPOSS (comparative example 2) can only reduce the dielectric constant to 2.7 with a lower tensile elongation at break and tensile fracture energy compared to primitive 6FDA-ODA type PI film; the film of the present invention has a lower dielectric constant, higher elongation at break and higher tensile fracture energy, showing good fracture toughness and higher use value.

TABLE 1 performance of the PI film prepared in examples and comparative examples

| | tensile modulus (GPa) | tensile strength (MPa) | elongation at break (%) | fracture energy (MJ/m$^3$) | dielectric constant |
|---|---|---|---|---|---|
| Example 1 | 2.7 | 93.6 | 30.9 | 26.2 | 2.2 |
| Example 2 | 2.8 | 95.9 | 27.5 | 23.5 | 2.2 |
| Example 3 | 3.4 | 118 | 12.7 | 12.0 | 2.7 |
| Example 4 | 3.1 | 92.4 | 24.2 | 21.3 | 2.3 |
| Example 5 | 3.7 | 96.6 | 23.3 | 21.5 | 2.4 |
| Comparative example 1 | 3.2 | 107 | 8.3 | 6.8 | 3.1 |
| Comparative example 2 | 3.0 | 85.2 | 3.7 | 2.3 | 2.7 |

The invention claimed is:

1. A method for preparing a polyimide film having a low dielectric constant and high fracture toughness, comprising the steps of:
   (1) dissolving aromatic diamine in a polar organic solvent at an ambient humidity of lower than 50% under ice bath and nitrogen atmosphere, maintaining a mass concentration of the aromatic diamine at 6% to 10%; after the aromatic diamine is completely dissolved, further stirring for 25-35 min to obtain an aromatic diamine solution; wherein the aromatic diamine is 4,4'-diaminodiphenyl ether, p-phenylenediamine or 4,4'-diamino-2,2'-bistrifluoromethylbiphenyl;
   (2) grinding and mixing poly(5-norbornene-2,3-dicarboxylic anhydride-alt-maleimide isobutyl polyhedral oligomeric silsesquioxane) and aromatic dianhydride, adding to the aromatic diamine solution prepared in step (1) and stirring for 12 to 24 h to obtain a poly(5-norbornene-2,3-dicarboxylic anhydride-alt-maleimide isobutyl polyhedral oligomeric silsesquioxane)/polyamic acid solution; wherein the molar ratio of the aromatic dianhydride and the aromatic diamine is 1:1, and the mass of the poly(5-norbornene-2,3-dicarboxylic anhydride-alt-maleimide isobutyl polyhedral oligomeric silsesquioxane) is 1% to 6% of the total mass of the aromatic dianhydride and the aromatic diamine;
   (3) uniformly applying the poly(5-norbornene-2,3-dicarboxylic anhydride-alt-maleimide isobutyl polyhedral oligomeric silsesquioxane)/polyamic acid solution prepared in step (2) on a clean glass sheet, then placing it in a vacuum drying oven to remove bubbles under vacuum for 4-6 h; heating and maintaining the temperature according to a preset program, which comprises maintaining at 70±2° C. for 1.8-2.2 h, maintaining at 120±2° C. for 1-1.2 h, maintaining at 150±2° C. for 1.8-2.2 h, maintaining at 200±2° C. for 1-1.2 h and maintaining at 300±2° C. for 1-1.2 h; after that cooling to room temperature, peeling off a film by ultrasonic in water, then drying the film under vacuum to obtain the polyimide film having a low dielectric constant and high fracture toughness.

2. The method for preparing a polyimide film having a low dielectric constant and high fracture toughness according to claim 1, wherein the polar organic solvent in step (1) is one or more selected from the group consisting of N-methylpyrrolidone, N, N-dimethylformamide and tetrahydrofuran.

3. The method for producing a polyimide film having a low dielectric constant and high fracture toughness according to claim 1, wherein the poly(5-norbornene-2,3-dicarboxylic anhydride-alt-maleimide isobutyl polyhedral oligomeric silsesquioxane) in step (2) is prepared by: dissolving norbornene dianhydride 5-norbornene-2,3-dicarboxylic anhydride and maleimide isobutyl polyhedral oligomeric silsesquioxane with a molar ratio of 2:1-4:1 in an inert solvent, keeping the total mass concentration of the 5-norbornene-2,3-dicarboxylic anhydride and the maleimide isobutyl polyhedral oligomeric silsesquioxane between 15% and 20%, and adding azobisisobutyronitrile initiator; then vacuumizing, refilling with nitrogen, and repeatedly conducting vacuumizing and refilling with nitrogen; after that heating to 65-75° C. for free radical copolymerization, finishing the reaction after stirring for 12-24 h; pouring the obtained solution in methanol for precipitation of pale yellow precipitate; then conducting filtration to obtain a residue, washing the residue with methanol repeatedly, and drying under vacuum to obtain a powdery poly(5-norbornene-2,3-dicarboxylic anhydride-alt-maleimide isobutyl polyhedral oligomeric silsesquioxane).

4. The method for preparing a polyimide film having a low dielectric constant and high fracture toughness according to claim 3, wherein the inert solvent is 1,4-dioxane, chlorobenzene, toluene or nitrobenzene.

5. The method for preparing a polyimide film having a low dielectric constant and high fracture toughness according to claim 3, wherein the amount of the azobisisobutyronitrile initiator is 0.1% to 1% of the total mass of the 5-norbornene-2,3-dicarboxylic anhydride and the maleimide isobutyl polyhedral oligomeric silsesquioxane.

6. The method for producing a polyimide film having a low dielectric constant and high fracture toughness according to claim 3, wherein said repeatedly conducting vacuumizing and refilling with nitrogen refers to conducting for three or more times.

7. The method for preparing a polyimide film having a low dielectric constant and high fracture toughness according to claim 1, wherein the aromatic dianhydride in step (2) is 1, 2, 4, 5-pyromellitic dianhydride, 3,3',4,4'-biphenyltetracarboxylic dianhydride or 4,4'-(hexafluoroisoprene) diphthalic anhydride.

8. The method for preparing a polyimide film having a low dielectric constant and high fracture toughness according to claim 1, when mixing the poly(5-norbornene-2,3-dicarboxylic anhydride-alt-maleimide isobutyl polyhedral oligomeric silsesquioxane) and the aromatic dianhydride followed by adding to the aromatic diamine solution, a mixture of the poly(5-norbornene-2,3-dicarboxylic anhydride-alt-maleimide isobutyl polyhedral oligomeric silsesquioxane) and the aromatic dianhydride is firstly divided into four equal portions, and each portion is added at an interval of 25-35 min.

9. The method for preparing a polyimide film having a low dielectric constant and high fracture toughness according to claim 1, wherein the time for peeling off the polyimide film in water by ultrasonic in step (3) is 5-10 min.

10. The method for preparing a polyimide film having a low dielectric constant and high fracture toughness according to claim 1, wherein said drying the film under vacuum is conducted in an oven at 60-80° C. for more than 12 h.

* * * * *